United States Patent
Morikawa et al.

(10) Patent No.: US 8,144,999 B2
(45) Date of Patent: Mar. 27, 2012

(54) IMAGE CAPTURING APPARATUS, IMAGE PROCESSING APPARATUS AND CONTROL METHODS THEREOF WITH DATA CONVERSION

(75) Inventors: Kenichi Morikawa, Kawasaki (JP); Satoshi Kirihara, Tama (JP); Shuntaro Aratani, Machida (JP); Eiichi Matsuzaki, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 1037 days.

(21) Appl. No.: 12/054,815

(22) Filed: Mar. 25, 2008

(65) Prior Publication Data

US 2008/0247654 A1 Oct. 9, 2008

(30) Foreign Application Priority Data

Apr. 9, 2007 (JP) ................................. 2007-102129

(51) Int. Cl.
*G06K 9/36* (2006.01)
(52) U.S. Cl. .................... 382/232; 345/555; 358/426.01; 375/240.03; 708/203
(58) Field of Classification Search .................. 382/232; 345/555; 358/426.01; 375/240.03; 708/203
See application file for complete search history.

(56) References Cited

U.S. PATENT DOCUMENTS

| | | | | |
|---|---|---|---|---|
| 5,404,174 A | * | 4/1995 | Sugahara | 348/700 |
| 5,623,308 A | * | 4/1997 | Civanlar et al. | 375/240.01 |
| 5,883,672 A | * | 3/1999 | Suzuki et al. | 375/240.04 |
| 6,323,905 B1 | | 11/2001 | Kondo et al. | |
| 2001/0020977 A1 | * | 9/2001 | Watanabe | 348/222 |
| 2006/0012616 A1 | * | 1/2006 | Paek | 345/698 |
| 2006/0050785 A1 | | 3/2006 | Watanabe et al. | |
| 2009/0022479 A1 | | 1/2009 | Kaku | |

FOREIGN PATENT DOCUMENTS

| | | |
|---|---|---|
| EP | 1503332 A | 2/2005 |
| JP | 2003-323612 | 11/2003 |
| JP | 2004-072148 A | 3/2004 |
| JP | 2006-019828 A | 1/2006 |
| JP | 2006-041861 A | 2/2006 |
| JP | 2006-352630 | 12/2006 |
| WO | 2005-046230 A | 5/2005 |

OTHER PUBLICATIONS

The above reference was cited in a Aug. 7, 2009 Chinese Office Action that issued in Chinese Patent Application No. 2008100810090663.1, which is enclosed with English Translation.
The above references were cited in a Aug. 31, 2011 European Search Report which is enclosed of the counterpart European Patent Application No. 08154217.7.
The above references were cited in a Jul. 15, 2011 Japanese Office Action, which is enclosed without English Translation, that issued in Japanese Patent Application No. 2007-102129.

* cited by examiner

*Primary Examiner* — Matthew Bella
*Assistant Examiner* — Eueng-Nan Yeh
(74) *Attorney, Agent, or Firm* — Cowan, Liebowitz & Latman, P.C.

(57) ABSTRACT

An image capturing apparatus determines an image frame to extract as a reference image frame from a plurality of image frames constituting a moving image, using a histogram, for example, and generates a reference image data file. An encoder unit encodes the plurality of image frames after reducing the resolution thereof, and generates an encoded moving image data file. A list associating the reference image frame with information specifying the corresponding reference image data file is generated with a content information list generating unit. The reference image data file, the encoded moving image data file and the list are then recorded.

14 Claims, 14 Drawing Sheets

FIG. 2

| CONTENT | PLAYBACK TIME | REFERENCE IMAGE |
|---------|---------------|-----------------|
| CONTENT A | Ta0 | IMAGE A0 |
|  | Ta1 | IMAGE A1 |
|  | Ta2 | IMAGE A2 |

F I G. 3
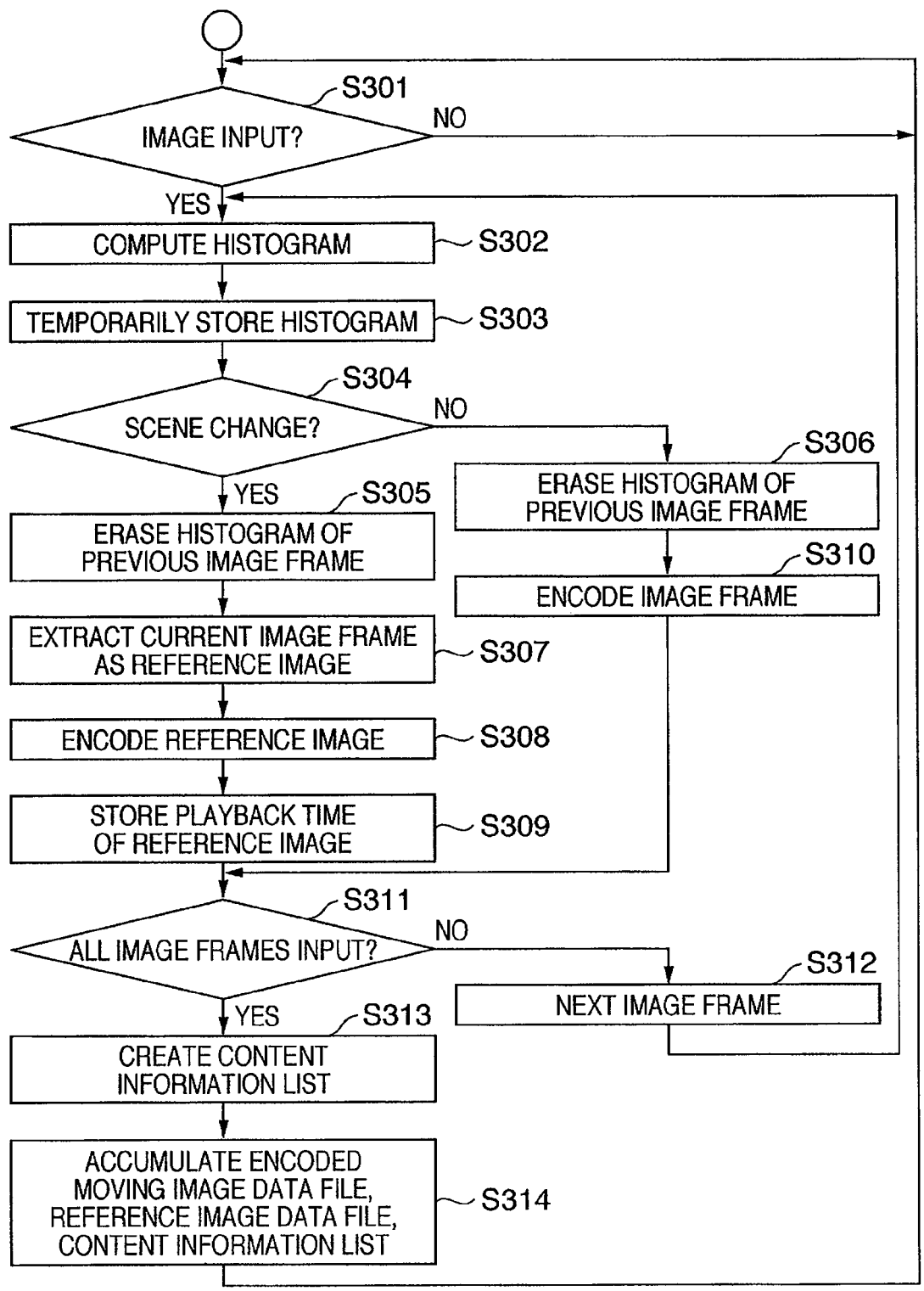

F I G. 6

| CONTENT | PLAYBACK TIME | REFERENCE IMAGE | RESOLUTION CONVERSION TABLE |
|---|---|---|---|
| CONTENT A | Ta0 | IMAGE A0 | TBL_A0 |
| | Ta1 | IMAGE A1 | TBL_A1 |
| | Ta2 | IMAGE A2 | TBL_A2 |
| CONTENT B | Tb0 | IMAGE B0 | TBL_B0 |
| CONTENT C | Tc0 | IMAGE C0 | TBL_C0 |
| | Tc1 | IMAGE C1 | TBL_C1 |

F I G. 9

| CONTENT | PLAYBACK TIME | REFERENCE IMAGE |
|---|---|---|
| CONTENT A | Ta0 | IMAGE A0 |
| | Ta1 | IMAGE A1 |
| | Ta2 | IMAGE A0 |

F I G. 12

| SHOOTING MODE | REFERENCE HISTOGRAM |
|---|---|
| PORTRAIT | Hist_Portrait |
| SPORTS | Hist_Sports |
| NIGHT | Hist_Night |
| SNOW | Hist_Snow |
| BEACH | Hist_Beach |
| SUNSET | Hist_Sunset |
| SPOTLIGHT | Hist_SpotLight |
| FIREWORKS | Hist_Hanbi |

IMAGE CAPTURING APPARATUS, IMAGE PROCESSING APPARATUS AND CONTROL METHODS THEREOF WITH DATA CONVERSION

BACKGROUND OF THE INVENTION

1. Field of the Invention

The present invention relates to an image capturing apparatus, an image processing apparatus and control methods thereof.

2. Description of the Related Art

Heretofore, image data conversion apparatuses and the like that convert the resolution of an image signal from standard definition (SD) to high definition (HD) have been proposed (see Japanese Patent Laid-Open No. 2003-323612). The apparatus disclosed in Japanese Patent Laid-Open No. 2003-323612 performs classification based on some characteristic amount per pixel block when resolution conversion is performed, with the object of performing optimal processing according to the characteristics of the image signal. The idea is to get a favorable resolution conversion result for the entire image by performing appropriate resolution conversion for each classification.

Also, an image processing apparatus has been proposed that acquires moving image data of a captured subject, and converts it into moving image data having a low resolution as well as generating still image data having a high resolution (see Japanese Patent Laid-Open No. 2006-352630).

In Japanese Patent Laid-Open No. 2003-323612, a resolution conversion table for common application to images of any content is created using learning images provided in advance, and resolution conversion is performed using this table during playback. However, the foregoing resolution conversion table has the average characteristics of a large number of learning images, and is not optimized for the individual images on which resolution conversion is actually performed.

Furthermore, in Japanese Patent Laid-Open No. 2006-352630, moving image data is generated in which acquired moving image data has been converted to have a low resolution, and still image data is generated from moving image data before being converted to have a low resolution. However, this still image data is used as general photograph data. Thus, generation timing of the still image data follows a user's instruction to record a still image. In other words, this still image data is not generated for use in resolution conversion.

SUMMARY OF THE INVENTION

The present invention has been made in consideration of the above problems with conventional technology. It is desirable to provide an image capturing apparatus that performs image capture enabling a favorable resolution conversion result to be obtained even in the case where resolution conversion is performed during playback to raise the resolution, and a control method thereof.

The present invention can also provide an image processing apparatus capable of excellent playback of images captured by the image capturing apparatus of the present invention, and a control method thereof.

According to an aspect of the present invention, there is provided an image capturing apparatus for capturing a moving image, comprising: a determining unit that determines an image frame to be used as a reference image frame in resolution conversion of the moving image, from a plurality of image frames constituting the moving image; a file generating unit operable to generate a reference image data file from the reference image frame determined by the determining unit; an encoding unit configured to reduce the resolution of the plurality of image frames and generate an encoded moving image data file from them; an information generating unit that generates information specifying the reference image frame; a list generating unit that generates a list associating the information generated by the information generating unit specifying the reference image frame with information specifying the reference image data file; and a first recording control unit operable to store the reference image data file, the encoded moving image data file and the list in a first storage unit.

According to another aspect of the present invention, there is provided an image processing apparatus, comprising: an acquisition unit operable to acquire the reference image data file, the encoded moving image data file and the list from an image capturing apparatus, and stores the acquired reference image data file, encoded moving image data file and list in a third storage unit; a first readout unit that reads out the reference image data file from the third storage unit; a resolution reduction unit that generates, from the reference image frame included in the read reference image data file, a low resolution reference image frame having a resolution equal to the image frames constituting the encoded moving image data file; a resolution conversion table generating unit that generates, from the reference image frame and the low resolution reference image frame, a resolution conversion table for raising the resolution of the image frames constituting the encoded moving image data file; a second readout unit that reads out the list from the third storage unit; a list editing unit that associates the resolution conversion table with the list, and outputs a resultant list; a second recording control unit that records the list output by the list editing unit and the resolution conversion table in the third storage unit; a decoding unit that decodes the encoded moving image data file, and outputs the image frames constituting the encoded moving image data file; a resolution conversion unit that performs resolution conversion on the image frames output by the decoding unit, with application of the resolution conversion table based on the list; and an output unit that outputs the resolution converted image frames.

According to further aspect of the present invention, there is provided an image processing apparatus, comprising: an acquisition unit operable to acquire the encoded moving image data file, the list and the resolution conversion table from an image capturing apparatus including: a resolution reduction unit that generates, from a reference image frame included in the read reference image data file, a low resolution reference image frame having a resolution equal to the image frames constituting the encoded moving image data file; a resolution conversion table generating unit that generates, from the reference image frame and the low resolution reference image frame, a resolution conversion table for raising the resolution of the image frames constituting the encoded moving image data file, and outputs the generated resolution conversion table; and a list editing unit that associates the resolution conversion table with the list, and outputs a resultant list, the image processing apparatus being configured to store the acquired encoded moving image data file, list and resolution conversion table in a third storage unit, the image processing apparatus further comprising: a decoding unit that decodes the encoded moving image data file, and outputs the image frames constituting the encoded moving image data file; a resolution conversion unit that performs resolution conversion on the image frames output by the decoding unit, with application of the resolution conversion table based on the list; and an output unit that outputs the resolution converted image frames.

According to yet further aspect of the present invention, there is provided a method of controlling an image capturing apparatus that captures a moving image, comprising: determining an image frame to be used as a reference image frame in resolution conversion of the moving image, from a plurality of image frames constituting the moving image; generating a reference image data file from the reference image frame; reducing the resolution of the plurality of image frames and generating an encoded moving image data file from the image frames having a reduced resolution; generating information specifying the reference image frame; generating a list associating the information generated in the information generating step specifying the reference image frame with information specifying the reference image data file; and storing the reference image data file, the encoded moving image data file and the list in a first storage unit.

According to another aspect of the present invention, there is provided a method of controlling an image processing apparatus being adapted to process images captured by an image capturing apparatus that includes: a determining unit that determines an image frame to be used as a reference image frame in resolution conversion of the moving image, from a plurality of image frames constituting the moving image; a file generating unit operable to generate a reference image data file from the reference image frame determined by the determining unit; an encoding unit configured to reduce the resolution of the plurality of image frames and generate an encoded moving image data file from them; an information generating unit that generates information specifying the reference image frame; and a list generating unit that generates a list associating the information generated by the information generating unit specifying the reference image frame with information specifying the reference image data file, the method comprising acquiring the reference image data file, the encoded moving image data file and the list generated by the image capturing apparatus, and storing the acquired reference image data file, encoded moving image data file and list in a storage unit; generating, from the reference image frame included in the read reference image data file, a low resolution reference image frame having a resolution equal to the image frames constituting the encoded moving image data file; generating, from the reference image frame and the low resolution reference image frame, a resolution conversion table for raising the resolution of the image frames constituting the encoded moving image data file; a list editing step of associating the resolution conversion table with the list, and outputting a resultant list; storing the list output in the list editing step and the resolution conversion table to the storage unit; decoding the encoded moving image data file, and outputting the image frames constituting the encoded moving image data file; performing resolution conversion on the image frames output in the decoding step, with application of the resolution conversion table based on the list; and outputting the resolution converted image frames.

According to yet further aspect of the present invention, there is provided a method of controlling an image processing apparatus adapted to process images captured by an image capturing apparatus that includes: a resolution reduction unit that generates, from the reference image frame included in the read reference image data file, a low resolution reference image frame having a resolution equal to the image frames constituting the encoded moving image data file; a resolution conversion table generating unit that generates, from the reference image frame and the low resolution reference image frame, a resolution conversion table for raising the resolution of the image frames constituting the encoded moving image data file, and outputs the generated resolution conversion table; and a list editing unit that associates the resolution conversion table with the list, and outputs a resultant list, the method comprising: acquiring the encoded moving image data file, the list and the resolution conversion table, generated by the image capturing apparatus and storing the acquired encoded moving image data file, list and resolution conversion table in a storage unit; decoding the encoded moving image data file, and outputting the image frames constituting the encoded moving image data file; performing resolution conversion on the image frames output in the decoding step, with application of the resolution conversion table based on the list; and outputting the resolution converted image frames.

Additional features of the present invention will become apparent from the following description of exemplary embodiments, taken in conjunction with the accompanying drawings.

BRIEF DESCRIPTION OF THE DRAWINGS

FIG. 2 shows an exemplary content information list generated by the image capturing apparatus according to the first embodiment of the present invention.

FIG. 3 is a flowchart illustrating an exemplary operation for extracting a reference image in the image capturing apparatus according to the first embodiment of the present invention.

FIG. 6 shows an exemplary content information list edited by a content information list editing unit in the image processing apparatus according to the first embodiment of the present invention.

FIG. 9 shows an exemplary content information list generated by the image capturing apparatus according to the second embodiment of the present invention.

FIG. 12 shows an exemplary table stored in a histogram reference table unit in the image capturing apparatus according to the third embodiment of the present invention.

DESCRIPTION OF THE EMBODIMENTS

Figure 1:
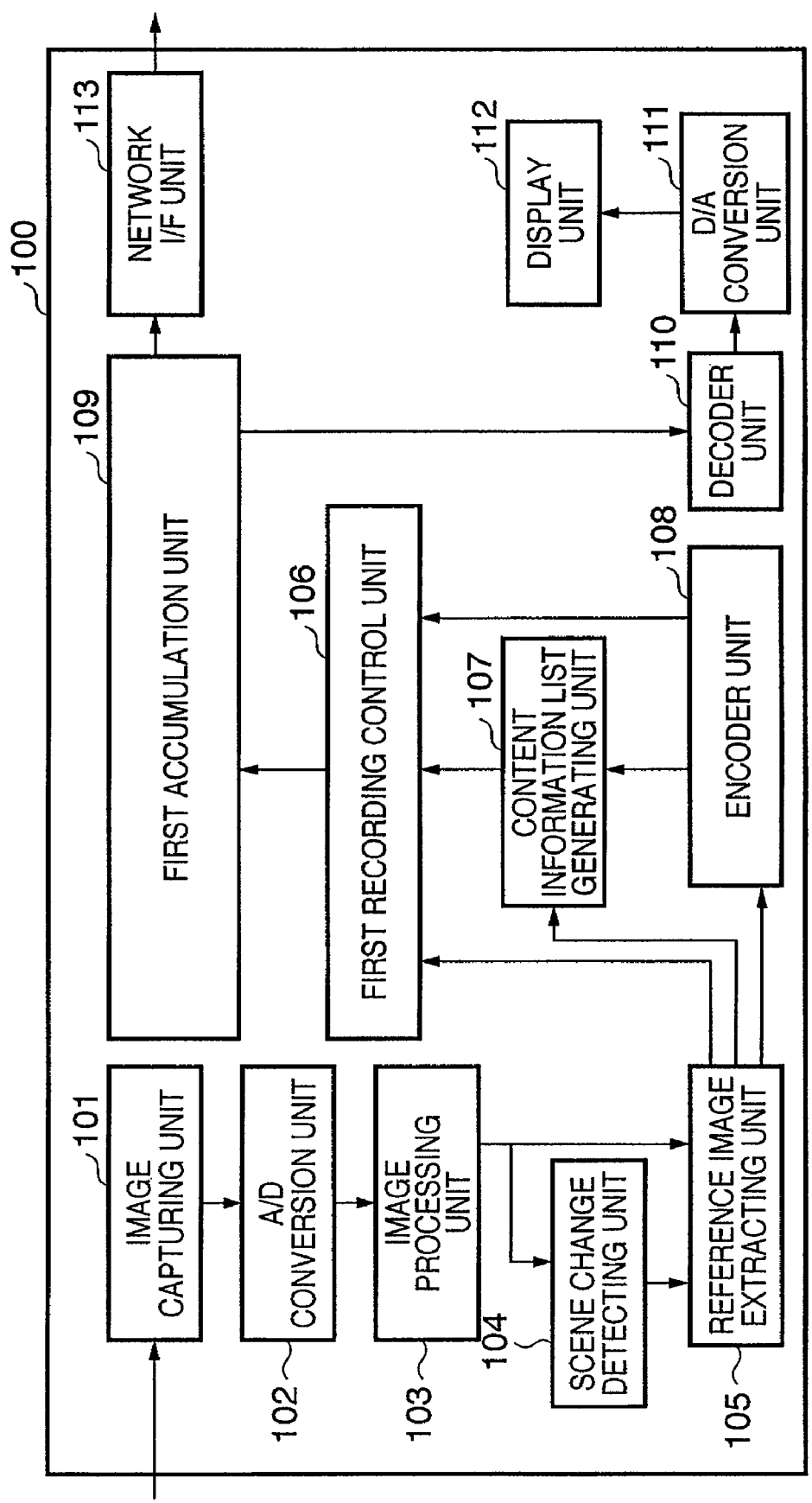
FIG. 1 is a block diagram showing an exemplary configuration of an image capturing apparatus according to a first embodiment of the present invention.

Preferred embodiments of the present invention will now be described in detail in accordance with the accompanying drawings.

First Embodiment

It is first noted that the meaning of "resolution" in the present invention is not limited to the pixel density of a given area, such as the number of pixels per inch, for example. "Resolution" in the present invention is an expression that also indicates the number of pixels originally in an image signal. Consequently, resolution conversion refers not only to converting the pixel density but also to processing to change the number of pixels. Reducing the resolution involves processing to reduce the number of pixels from the image signal. Raising the resolution involves processing to increase the number of pixels included in the image signal. It is to be understood that the term "resolution" in the claims, specification and drawings of the present invention is utilized in line with the foregoing definitions.

In the present embodiment, an image capturing apparatus extracts an image frame that satisfies a prescribed condition as a reference image from a series of captured image frames, and stores the extracted image frame without dropping the resolution (without reducing the pixel count). The image capturing apparatus then applies a compression coding process to the captured image frames after reducing the resolution in accordance with a standard or a setting, for example, from the resolution of the image when captured, and generates and stores the series of compressed image frames as an encoded moving image data file. The image capturing apparatus generates information specifying the image frame extracted as a reference image. The image capturing apparatus further generates and stores a list associating the information specifying the extracted image frame with information specifying a reference image data file of the reference image.

Note that in the present invention, a "data file" is a unit for handling data with a given coherence, and that a single data file includes at least one set of data sorted by a given rule. Additional information such as information related to the data set is also included as necessary. For example, a reference image data file includes one or more sets of pixel data constituting an image frame extracted as a reference image. Also, an encoded moving image data file includes the pixel data of one or more image frames. Data files can be uniquely specified by filename, for example.

Further, an image processing apparatus of the present embodiment acquires the reference image, the content information list and the encoded moving image data file stored by the image capturing apparatus. The image processing apparatus uses the reference images to generate resolution conversion tables for raising the resolution of the image frames constituting the encoded moving image data file. The image processing apparatus decodes the encoded moving image data file, performs resolution conversion on the decoded image frames using a resolution conversion table specified based on the content information list, and displays the resolution converted image frames. Due to this processing, resolution conversion can be performed using resolution conversion tables suitable for the images to actually undergo resolution conversion, enabling a high quality result to be obtained.

Exemplary device configurations and operations will now be described in detail.

FIG. 1 is a block diagram showing an exemplary configuration of an image capturing apparatus 100 according to the first embodiment of the present invention. The image capturing apparatus 100 has a moving image shooting function.

An image capturing unit 101 is provided with a CCD, CMOS or similar image sensor, and generates, in pixel units, a video signal corresponding to an optical image formed by a lens (not shown). An analog-to-digital (A/D) conversion unit 102 converts the video signal generated by the image capturing unit 101 to a digital signal. An image processing unit 103 performs image processing such as gamma correction and white balance adjustment.

A scene change detecting unit 104 computes a histogram that classifies, for example, the luminance and color signals of pixels constituting a single input image (image frame) per level, and stores the generated histogram. The scene change detecting unit 104 compares the histogram of the image frame currently input with the histogram of the previous image frame, and determines that the scene has changed if the amount of change in the histograms is greater than a set threshold value. After the determination process, the scene change detecting unit 104 erases the histogram data of the previous image frame.

If it is determined that the scene has changed, the scene change detecting unit 104 notifies reference image extracting unit 105 that the current image frame is to be extracted as a reference image.

On receipt of the notification from the scene change detecting unit 104, the reference image extracting unit 105, which functions as a file generating unit, recognizes the current image frame as the first image frame after the scene change. The reference image extracting unit 105 generates a reference image data file that includes the data of the current image frame without reducing the resolution, and transmits the generated reference image data file to a first recording control unit 106.

The reference image extracting unit 105 also notifies content information list generating unit 107 that a reference image has been extracted. The reference image extracting unit 105 further transmits the data of all input image frames to an encoder unit 108, irrespective of whether the current frame is made a reference image.

The encoder unit 108, which functions as an encoding unit, compression codes the data of the input image frames in accordance with an encoding system such as MPEG2 or H.264, for example, and transmits the encoded moving image data file thus obtained to the first recording control unit 106. Note that in the present embodiment, compression coding is performed after decreasing the resolution of the image frames to a resolution based on a predetermined standard, a user setting or the like. This is the case, for example, where an SD (720×480 pixels) image is generated and recorded from a captured image of a resolution (1440×1080 pixels) determined by the HDV standard, or where an HDV image is generated and recorded from an image having a higher resolution than 1440×1080 pixels. Consequently, in the present embodiment, the resolution of a reference image is higher than the resolution of image frames constituting the encoded moving image data file.

The encoder unit 108 transmits playback time information for the current image frame to the content information list generating unit 107 if the current image frame is being extracted as a reference image. A presentation time stamp (PTS) inserted in a PES header can be used as the playback time information in the case where image frames are configured as an MPEG2-TS encoded moving image data file, for example. Time information of arbitrary format can be utilized, provided the playback time of a reference image can be specified when playing an encoded moving image data file. That is, the encoder unit 108 also functions as an information generating unit that generates information for specifying the image frame extracted as a reference image.

Note that in the present embodiment, playback time information generated by the encoder unit 108 is used as information for specifying the image frame extracted as a reference image, although the information generating unit of the present invention is not necessarily limited to an encoding unit. Also, the information for specifying the image frame is not limited to playback time information. Any information is acceptable, provided the information is capable of specifying and identifying an image frame.

The content information list generating unit 107 generates a content information list such as shown in FIG. 2, for example, that associates information (content name) specifying an encoded moving image data file with playback time information received from the encoder unit 108 and information (image data filename) specifying a reference image data file. The content information list generating unit 107 transmits the generated content information list to the first recording control unit 106.

The first recording control unit 106 stores reference image data files from the reference image extracting unit 105, content information lists from content information list generating unit 107, and encoded moving image data files from the encoder unit 108 in a first accumulation unit 109, which functions as a first storage unit.

The first accumulation unit 109 is a storage unit such as an HDD or a semiconductor memory, for example, and stores captured image data files, reference image data files, content information lists and the like.

When playing a captured image data file with the image capturing apparatus 100, an image data file stored in the first accumulation unit 109 is supplied to a decoder unit 110. The decoder unit 110 applies a decoding process to the encoded image data file and supplies decoded image data to a digital-to-analog (D/A) conversion unit 111. The D/A conversion unit 111 converts the digital data decoded by the decoder unit 110 to analog data, and outputs the analog data to a display unit 112. The display unit 112 displays the analog data from the D/A conversion unit 111 as video.

A network interface (I/F) unit 113 is a network interface such as an Ethernet interface or an IEEE 1394 interface, for example. The image capturing apparatus 100 of the present embodiment is able to transmit image data files, reference images and content information lists stored in the first accumulation unit 109 to an external device such as an apparatus having an image playback function, for example, in association with one another.

FIG. 3 is a flowchart illustrating an exemplary operation for extracting a reference image in the image capturing apparatus 100 of the present embodiment.

When the image capturing apparatus 100 is started up, the scene change detecting unit 104 firstly determines whether there is image input, that is, whether the image capturing apparatus 100 is in a shooting state (S301). If there is image input, the scene change detecting unit 104 computes a histogram for the input image frame (S302). The scene change detecting unit 104 then temporarily stores the data of the computed histogram in an internal memory or the like (not shown) (S303).

Next, the scene change detecting unit 104 determines whether the scene has changed, based on the histogram data of the previous image frame temporarily stored in the internal memory or the like and the data of the histogram computed this time (S304). If the amount of change in the histograms is greater than a threshold, for example, it can be determined that the scene has changed (i.e., that an image differing greatly from the image captured up till then has been input). Any method of computing the amount of change in histograms is acceptable. For example, the correlation in shape or the total difference in the frequencies of same level data can be used. Note that changes in scene may also be detected with a method not based on histograms.

The scene change detecting unit 104 erases the histogram data of the previous image frame after determining whether there has been a scene change in relation to the current frame (S305, S306), irrespective of the determination result. The histogram data for the current image frame is used as the histogram data of the previous image frame when the scene change determination is performed in relation the next image frame.

If it is determined that there is a scene change, the scene change detecting unit 104 notifies this to the reference image extracting unit 105. The reference image extracting unit 105 extracts the image frame corresponding to the notification as a reference image (S307). The reference image extracting unit 105 generates an image data file that includes the extracted reference image at the original resolution, and preferably either in an unencoded state or losslessly encoded state, and outputs the generated image data file to the first recording control unit 106. The reference image extracting unit 105 also notifies information specifying the generated image data file (e.g., image data filename) to the content information list generating unit 107. The reference image extracting unit 105 further outputs all input image frames to the encoder unit 108.

The encoder unit 108 encodes all image frames input from the reference image extracting unit 105, using a compression coding system such as MPEG2 or H.264 (S308, S310). If, at this time, the image frame to encode has been extracted as a reference image, the encoder unit 108 notifies the playback time information of that image frame to the content information list generating unit 107.

In S311, the scene change detecting unit 104 determines whether all frames have been input, that is, whether shooting has ended. If all frames have not been input (S311: No), the processing proceeds to the next image frame in S312, and a histogram is again computed in S302. On the other hand, if all frames have been input (S311: Yes), the content information list generating unit 107 generates the above content information list (S313).

In S314, the first recording control unit 106 records the encoded moving image data file from the encoder unit 108, the reference image data file from the reference image extracting unit 105, and the content information list from the content information list generating unit 107 to the first accumulation unit 109 in association with one another.

The processing then returns to S301, and waits again for the next image to be input.

Figure 4:
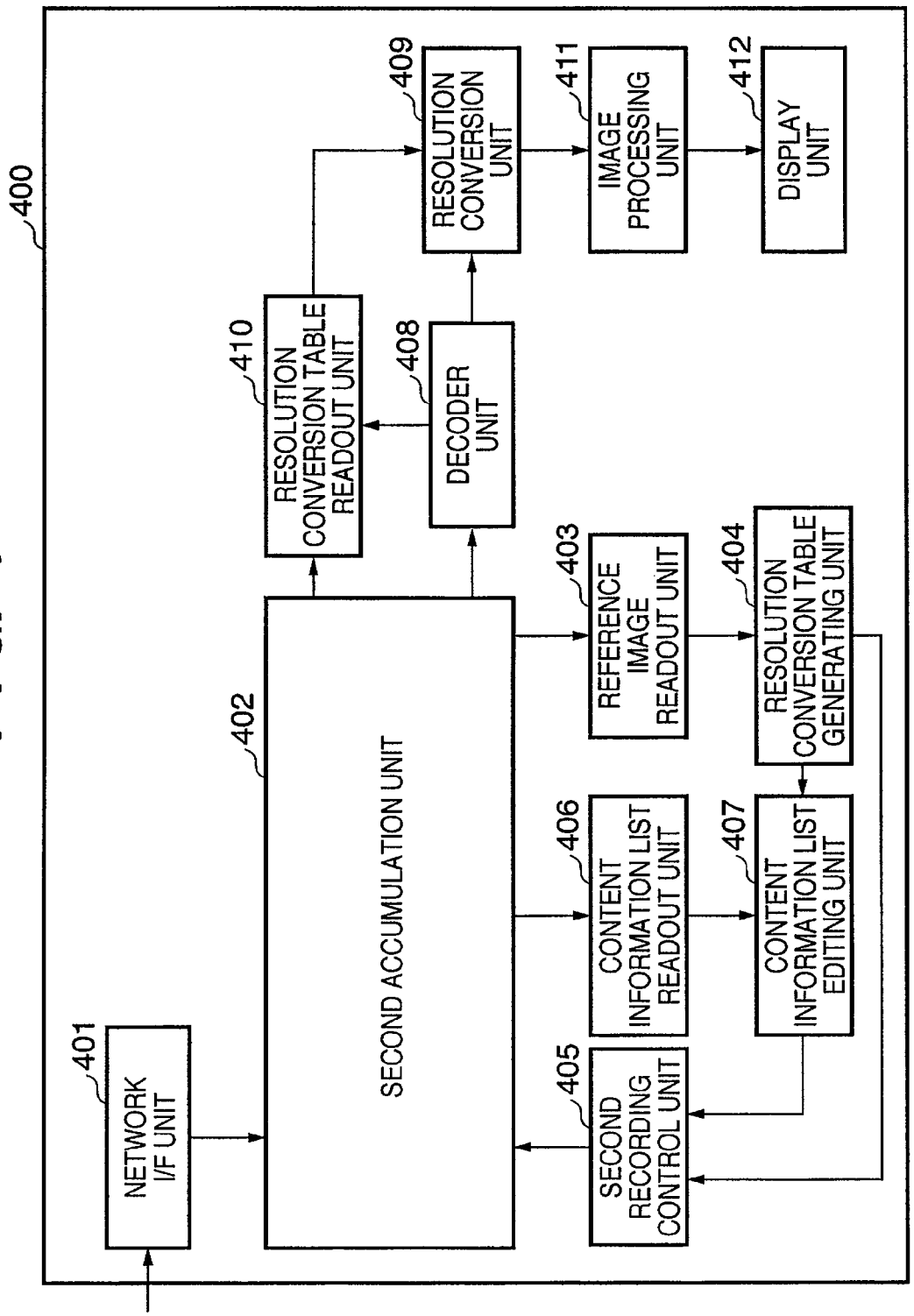
FIG. 4 is a block diagram showing an exemplary configuration of an image processing apparatus according to the first embodiment of the present invention.

FIG. 4 is a block diagram showing an exemplary configuration of an image processing apparatus 400 according to the present embodiment.

A network interface (I/F) unit 401 is a network interface such as an Ethernet interface or an IEEE 1394 interface, for example. There are no restrictions on data transmitted and received or devices that can communicate via the network I/F unit 401. Here, however, the image processing apparatus 400 will be described as being connected to the image capturing apparatus 100 shown in FIG. 1 via the network I/F unit 401 to form an image processing system, and as receiving data from the image capturing apparatus 100.

The network I/F unit 401 receives the encoded moving image data files, reference image data files and content information lists from the image capturing apparatus 100, and writes them to a second accumulation unit 402, which is a storage unit such as an HDD, semiconductor memory or the like and functions as a third storage unit.

A reference image readout unit 403, which functions as a first readout unit, reads out the reference image data files accumulated in the second accumulation unit 402, and supplies the read reference image data files to a resolution conversion table generating unit 404. The resolution conversion table generating unit 404 generates resolution conversion tables using the reference images.

Figure 5:
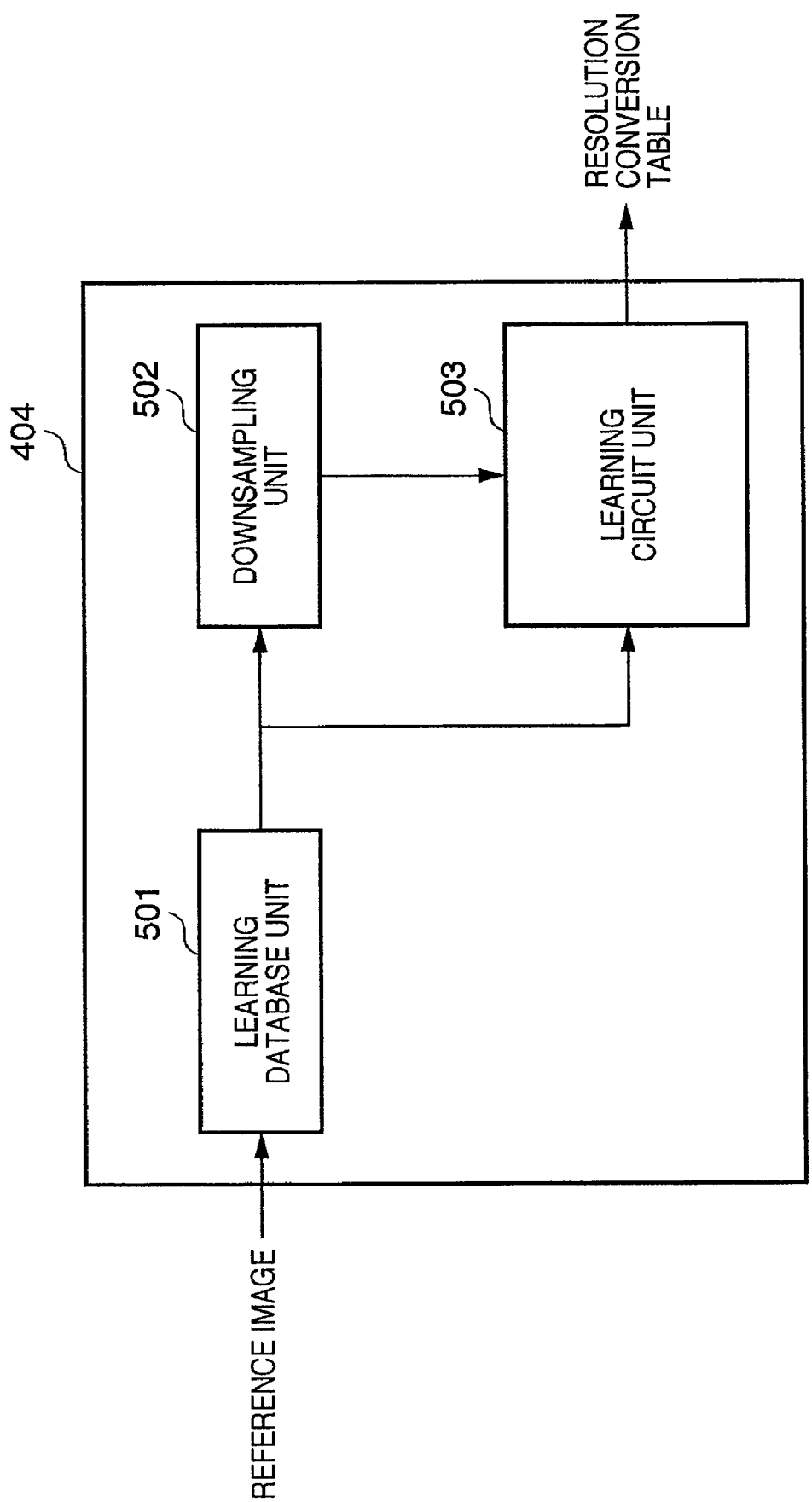
FIG. 5 is a block diagram showing an exemplary configuration of a resolution conversion table generating unit in the image processing apparatus according to the first embodiment of the present invention.

FIG. 5 is a block diagram showing an exemplary configuration of the resolution conversion table generating unit 404. The resolution conversion table generating unit 404 is composed of a learning database unit 501 that accumulates reference image data files, a downsampling unit 502 that downsamples reference image frames, and a learning circuit unit 503.

The learning database unit 501 adds reference image data files received from the reference image readout unit 403 to an internal learning database. On the other hand, the learning database unit 501 sequentially outputs reference image data files accumulated in the learning database to the downsampling unit 502 and the learning circuit unit 503.

The downsampling unit 502, which functions as a resolution reduction unit, performs decimating and filtering on the reference image frames included in an input reference image data file, and downsamples the reference image frames to the same resolution as the image frames constituting the encoded moving image data file. The downsampling unit 502 outputs the obtained low resolution reference image frame to the learning circuit unit 503. The learning circuit unit 503 learns by least square error criteria, for example, using the low resolution reference image frame input from the downsampling unit 502 and the high resolution reference image frame input from the learning database unit 501, and generates a resolution conversion table.

A resolution conversion table generated here indexes data obtained by coding the characteristic information between pixels in the input image, and obtains a result with increased pixel density. That is, resolution conversion tables are generated that enable high resolution reference image frames to be obtained from corresponding low resolution reference image frames. Here, learning by least squares is described, although learning for resolution conversion tables may also be performed using a neutral network. The learning circuit unit 503 outputs the obtained resolution conversion table to a second recording control unit 405. The learning circuit unit 503 also notifies information specifying the generated resolution conversion table (e.g., table name) and information specifying the reference image data file used to a content information list editing unit 407.

Returning to FIG. 4, a content information list readout unit 406, which functions as a second readout unit, reads out content information lists from the second accumulation unit 402, and supplies the read lists to the content information list editing unit 407. The content information list editing unit 407 adds the information specifying the resolution conversion tables notified from the resolution conversion table generating unit 404 to the content information lists, and outputs a resultant list to a second recording control unit 405. An exemplary edited content information list output by the content information list editing unit 407 is shown in FIG. 6. As shown in FIG. 6, information specifying the resolution conversion tables has been added in association with playback times.

The second recording control unit 405 performs a control to write the resolution conversion tables generated by the resolution conversion table generating unit 404 and the content information list edited by the content information list editing unit 407 to the second accumulation unit 402.

When playing an encoded moving image data file, a decoder unit 408 performs decoding while reading out the encoded moving image data file from the second accumulation unit 402, and supplies decoded image frames sequentially to a resolution conversion unit 409. The decoder unit 408 also outputs the PTS of decoded image frames to a resolution conversion table readout unit 410 as playback time information.

If a playback time shown by the playback time information received from the decoder unit 408 matches a playback time included in the content information list, the resolution conversion table readout unit 410 reads out the resolution conversion table associated with that playback time from the second accumulation unit 402. The resolution conversion table readout unit 410 then supplies the read resolution conversion table to the resolution conversion unit 409.

The resolution conversion unit 409 performs resolution conversion on the image frames input from the decoder unit 408, using the resolution conversion table received from the resolution conversion table readout unit 410, and raises the resolution of the image frames. With resolution conversion, data obtained by analyzing an input image and coding the characteristic information of pixels is indexed, and pixel density is increased by applying resolution conversion tables to obtain a higher resolution image than the input image. An image processing unit 411 performs image processing such as color processing and gamma processing, and displays the resolution converted image on a display unit 412.

Figure 7:
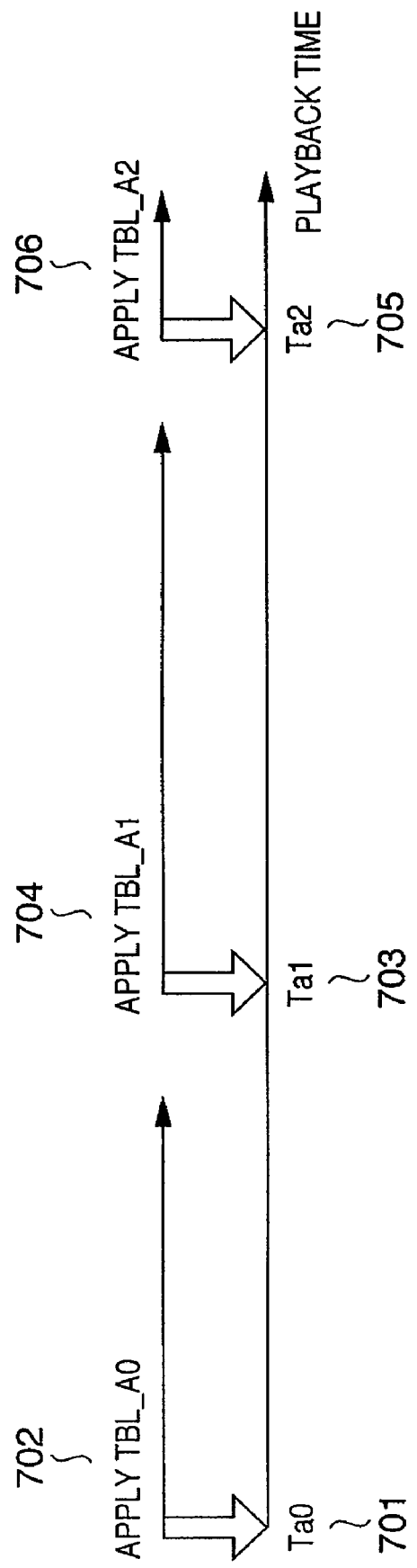
FIG. 7 shows an application timing of a resolution conversion table for when an encoded moving image data file corresponding to a content A shown in the content information list of FIG. 6 is played.

FIG. 7 shows the application timing of resolution conversion tables for when an encoded moving image data file corresponding to content A shown in the content information list of FIG. 6 is played.

The resolution conversion unit 409 applies a first resolution conversion table TBL_A0 (702) in resolution conversion from the image frame at playback time Ta0 (701). TBL_A0 is then applied in resolution conversion performed on image frames until playback time Ta1 is reached.

Then, from the image frame at playback time Ta1 (703), a resolution conversion table TBL_A1 (704) is applied in resolution conversion. TBL_A1 is applied in resolution conversion performed on image frames until playback time Ta2 (705) is reached, similarly to the above. Further, from the image frame at playback time Ta2, the resolution conversion unit 409 switches to applying a resolution conversion table TBL_A2 (706).

A resolution conversion table generated from a representative image of a scene (here, the first image of a scene) is thus applied every time a scene change is detected. Since image frames constituting the same scene are usually highly correlated, a resolution conversion result suitable for the image frames constituting a scene can be obtained by applying a resolution conversion table generated from a representative image of that scene.

The number of pixels in image sensors has increased rapidly relative to the determination cycle of record formats for moving images. There are also quite a few apparatuses primarily for shooting moving images such as video cameras that are provided with an image sensor having more pixels than are used in moving image recording, given the demand for high resolution still image recording. However, in has been the case that even if high resolution images are shot, they cannot necessarily be used effectively since moving image recording is performed after reducing the resolution. In contrast, the present embodiment enables resolution conversion tables suitable for images to which resolution conversion is applied to be generated with high accuracy and a simple configuration, by utilizing high resolution images that have actually been shot for generating the resolution conversion tables.

With the image capturing apparatus 100 of the present embodiment, image frames obtained when moving image shooting is performed are extracted as reference images before dropping the resolution. Therefore, the shooting conditions (focal length, depth of field, exposure conditions, etc.) of the camera that shot the reference image and the image frames constituting the encoded moving image data file will inevitably be the same. However, when shooting still images for use as reference images separately from moving images using a plurality of cameras, for example, suitable still images can be extracted as reference images by communicating between the plurality of cameras to make the shooting conditions uniform.

A playback apparatus of the present embodiment generates resolution conversion tables by a learning process that uses reference images. However, resolution conversion tables of a plurality of patterns may be provided in advance with the resolution conversion table generating unit 404, and one of these may be used. Specifically, it is possible to apply a plurality of resolution conversion tables to a downsampled reference image, and use the resolution conversion table that yields an image closest to the original (high resolution) reference image.

The present embodiment has been described in terms of content files (encoded moving image data files), reference images and content information lists being transferred from the image capturing apparatus 100 to a playback apparatus via a network. However, this transfer may be performed via a removable storage medium such as a memory card or an optical disk, or a data communicable display interface such as the High-Definition Multimedia Interface (HDMI).

Also, while the first image frame in which a scene change is detected is extracted as a reference image in the present embodiment, a single reference image may be generated by averaging a plurality of the image frames included in the same scene. A plurality of reference images may also be extracted from the same scene. For example, after extracting the first image frame in which a scene change is determined as a reference image, image frames exhibiting high similarity to the histogram of this reference image can then be extracted as additional reference images in the scene. In this case, the plurality of reference images are associated with the same playback time in the content information list. The resolution conversion table generating unit 404 in the image processing apparatus 400 generates a single resolution conversion table based on the plurality of (original resolution and downsampled) reference images associated with the same playback time.

In the present embodiment, the image capturing apparatus 100 extracts a high resolution reference image for each scene, while the image processing apparatus 400 generates resolution conversion tables using the reference images, and performs resolution conversion while switching the applied resolution conversion table for each scene when playback is performed, enabling a resolution conversion result suitable for the content of the image frames to be obtained.

Note that instead of extracting a reference image whenever there is a scene change, a reference image may be extracted when a certain set period elapses by providing a timer or the like in the image capturing apparatus 100. Also, a reference image may be extracted when the recording switch of the image capturing apparatus 100 is turned on.

An image frame actually shot with a higher resolution than the image frames constituting the encoded moving image data file is used as a reference image, enabling a more favorable result to be obtained than a resolution conversion table generated from an unrelated image.

Second Embodiment

In the first embodiment, a reference image was extracted for every scene, whereas in the present embodiment, previously extracted reference images are stored and reused.

Figure 8:
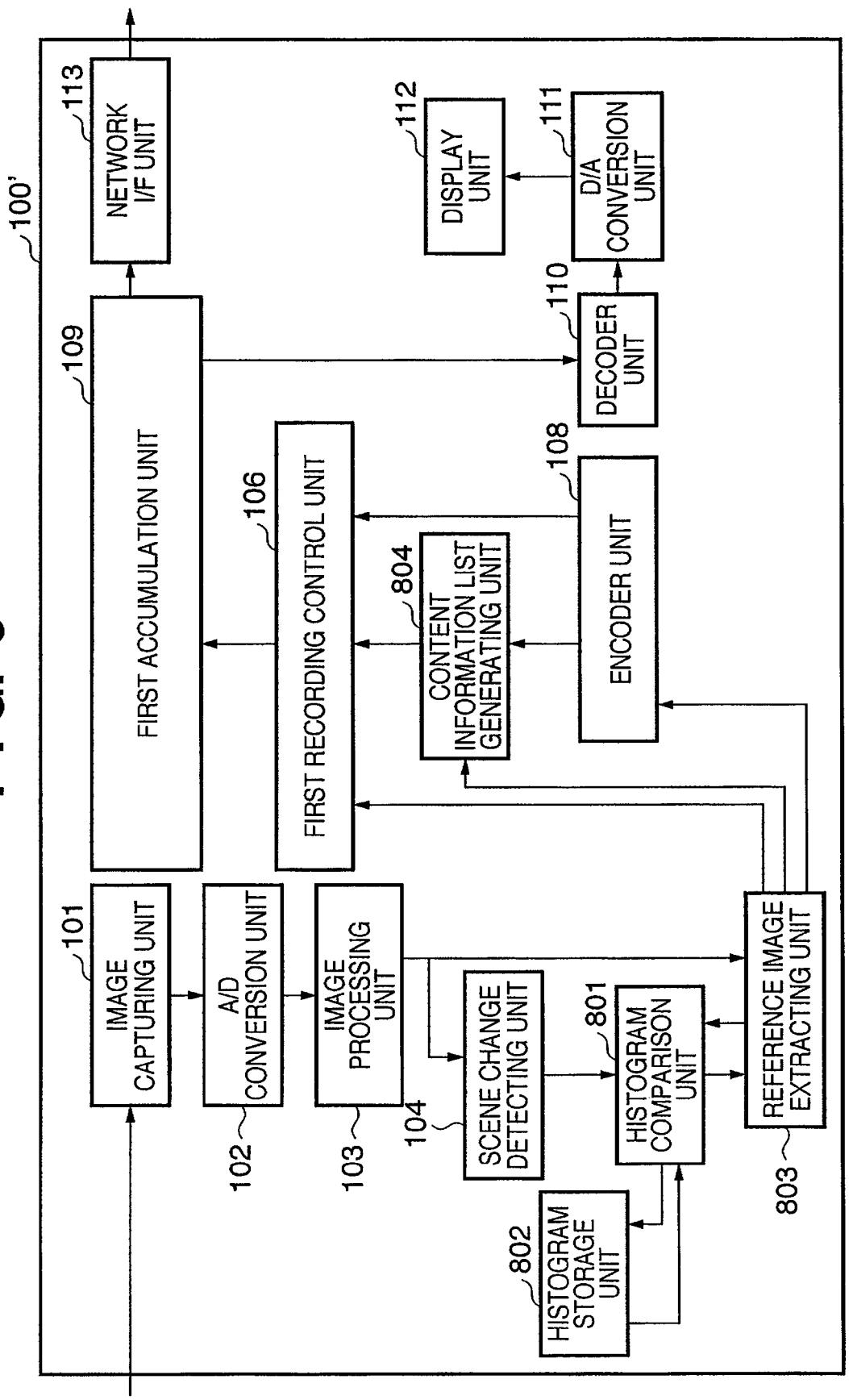
FIG. 8 is a block diagram showing an exemplary configuration of an image capturing apparatus according to a second embodiment of the present invention.

FIG. 8 is a block diagram showing an exemplary configuration of an image capturing apparatus 100' according to the present embodiment. In FIG. 8, the same reference numerals are attached to constituent elements as in FIG. 1, and redundant description is omitted. The following description will focus on the characteristic configuration of the present embodiment and the operations thereof.

A histogram storage unit 802 saves the histogram data of image frames already extracted as reference images in association with information specifying the corresponding reference image data files.

The scene change detecting unit 104 determines whether there has been a scene change based on a histogram, similarly to the first embodiment. If it is determined that the scene has changed, the histogram data of the current image frame is output to a histogram comparison unit 801.

The histogram comparison unit 801 compares the histogram data received from the scene change detecting unit 104 with histogram data stored in the histogram storage unit 802. The histogram comparison unit 801 determines that the current image frame is to be extracted as a reference image if the comparison result indicates that there are no stored histograms that exhibit high similarity, and notifies a reference image extracting unit 803 to extract the current image frame as a reference image. The histogram comparison unit 801 then stores the histogram data of the current image frame in the histogram storage unit 802 in the case where it is determined that the current image frame is to be extracted as a reference image.

Here, the similarity between histograms can be derived with an arbitrary method. For example, if the total difference in frequency values for each level constituting the histograms exceeds a threshold, it can be determined that similarity is low.

On the other hand, if it is found that any of the stored histograms exhibits high similarity, the histogram comparison unit 801 judges that one of the previously extracted reference images approximates the current image frame. In this case, the histogram comparison unit 801 notifies information specifying a past reference image data file corresponding to the histogram found to have high similarity, rather than notifying that the current image frame be extracted as a reference image.

The reference image extracting unit 803, having received a notification to extract a reference image, generates a reference image data file from the current image frame in a similar manner to the reference image extracting unit 105 in the first embodiment, and supplies the generated reference image data file to the first recording control unit 106. The reference image extracting unit 803 further notifies information specifying the reference image data file (e.g., filename) to the histogram comparison unit 801.

The histogram comparison unit 801, on receipt of the notification from the reference image extracting unit 803, stores the notified information specifying the reference image data file in association with the histogram data of the current image frame stored in the histogram storage unit 802.

If notification of information specifying the reference image data file is received from the histogram comparison unit 801, the reference image extracting unit 803 further notifies this information to a content information list generating unit 804.

The encoder unit 108 encodes all image frames input from the reference image extracting unit 803, using a compression coding system such as MPEG2 or H.264. If, at this time, the image frame to encode is an image frame extracted as a reference image or an image frame in which a scene change is determined, the encoder unit 108 notifies the playback time information of that image frame to the content information list generating unit 804.

The content information list generating unit 804 generates a content information list in a similar manner to the first embodiment. The only difference from the first embodiment is that the information specifying a reference image data file provided from the reference image extracting unit 803 can be information specifying a past reference image data file.

For example, if it is determined that the histogram of the first image frame of a scene (scene 3) starting from playback time Ta2 is similar to the first image frame of a scene (scene 1) starting from playback time Ta0, a content information list such as shown in FIG. 9 is generated. In FIG. 9, the reference image data file (image A0) corresponding to scene 1 is also used as the reference image data file corresponding to scene 3.

Figure 10:
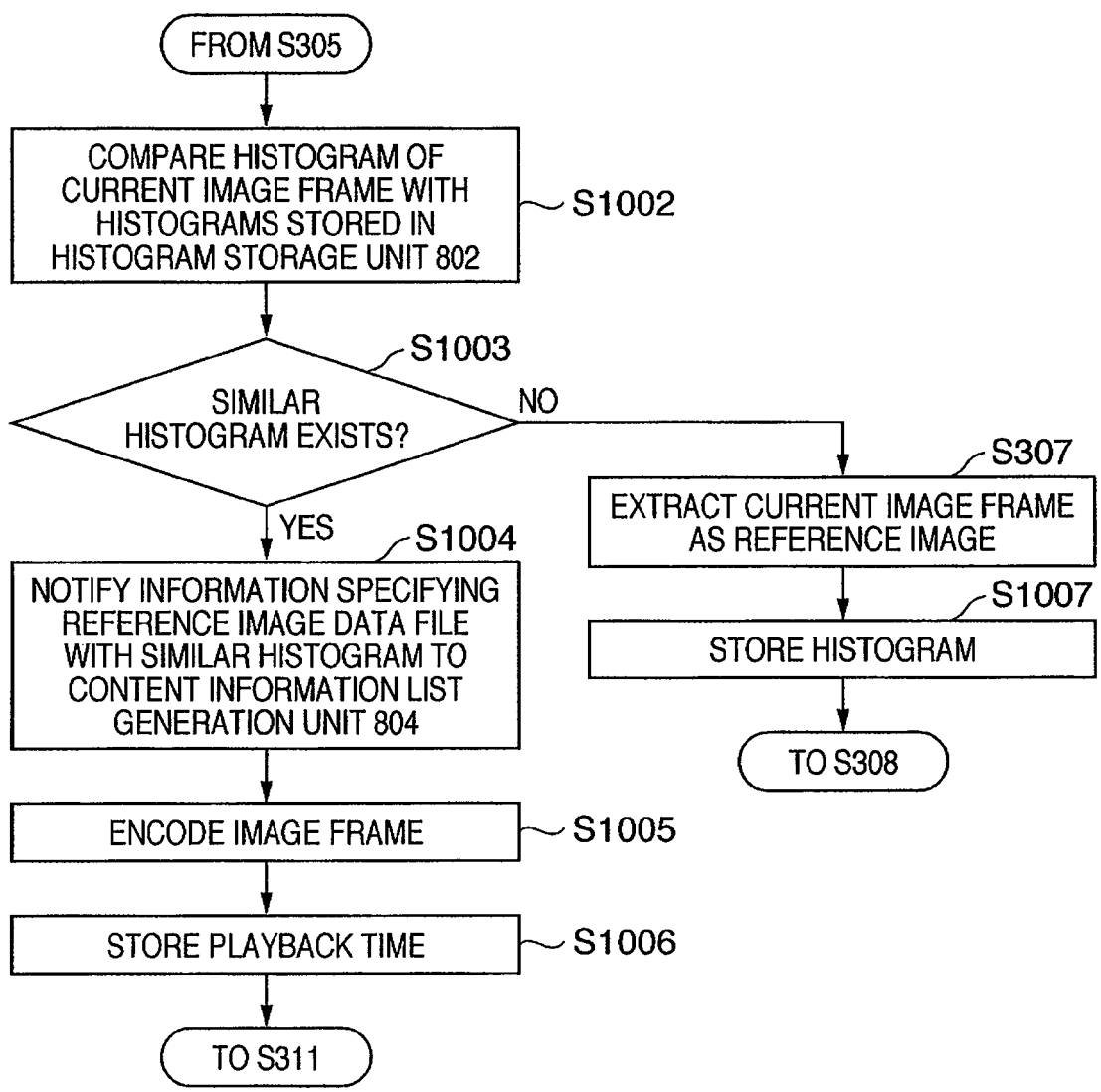
FIG. 10 is a flowchart illustrating an exemplary operation for extracting a reference image in the image capturing apparatus according to the second embodiment of the present invention.

FIG. 10 is a flowchart illustrating an exemplary operation for extracting a reference image in the image capturing apparatus 100' of the present embodiment. Here, only those parts that differ from the flowchart of the first embodiment described in FIG. 3 are shown.

The processing of S301 to S305 in FIG. 3 is performed similarly to the first embodiment. The scene change detecting unit 104, however, notifies the histogram comparison unit 801 rather than the reference image extracting unit 803 that a scene change has been determined.

In S1002, the histogram comparison unit 801 compares the histogram of the current image frame with histograms stored in the histogram storage unit 802.

Next, in S1003, the histogram comparison unit 801 determines whether any of the histograms stored in the histogram storage unit 802 are similar to the histogram of the current image frame.

If there are not any histograms determined to be similar, the histogram comparison unit 801 notifies the reference image extracting unit 105 to extract the current image frame as a reference image. The reference image extracting unit 105 extracts the current image frame as a reference image (S307), generates a reference image data file, and supplies the generated reference image data file to the first recording control unit 106. The reference image extracting unit 105 further notifies information specifying the reference image data file to the histogram comparison unit 801.

Next, the histogram comparison unit 801 stores the histogram of the current image frame in the histogram storage unit 802 (S1007). At this time, the histogram comparison unit 801 stores the histogram of the current image frame in the histogram storage unit 802 in association with the information specifying the reference image data file.

The processing from S308 is then performed.

On the other hand, if there is a histogram determined in S1003 to be similar, the histogram comparison unit 801 reads out information specifying the reference image data file corresponding to that histogram from the histogram storage unit 802. The histogram comparison unit 801 then notifies the information specifying the reference image data file to the content information list generating unit 804 (S1004).

The encoder unit 108 encodes the current image frame using a compression coding system such as MPEG2 or H.264 (S1005). The encoder unit 108 then notifies the playback time information of the current image frame to the content information list generating unit 804 (S1006).

The processing from S311 (FIG. 3) is then performed.

Since the configuration and operations of an image processing apparatus according to the present embodiment may be the same as the image processing apparatus 400 of the first embodiment, description will be omitted.

Note that in the present embodiment, the histogram of the image frame in which a scene change is determined is compared with the histograms of past reference images, and this image frame is extracted as a reference image if there are no similar histograms. However, the past reference images themselves may be stored, and an image frame to extract as a reference image may be decided based on the similarity between images.

Also, a subsequent image may also be used as a previous reference image, rather than reusing a previously extracted reference image. That is, in the case of the FIG. 9 example, the image frame (assume it is image A2) corresponding to the playback time Ta2 may be associated with the playback time Ta0 instead of the image A0, which is the previous reference image that was similar. Alternatively, an image having a large high frequency component, considered to indicate a high resolution, may be preferentially used out of the similar images.

Thus, the image capturing apparatus 100' of the present embodiment enables the required storage capacity for accumulating high resolution reference images to be reduced, since similar reference images are shared.

Third Embodiment

Figure 11:
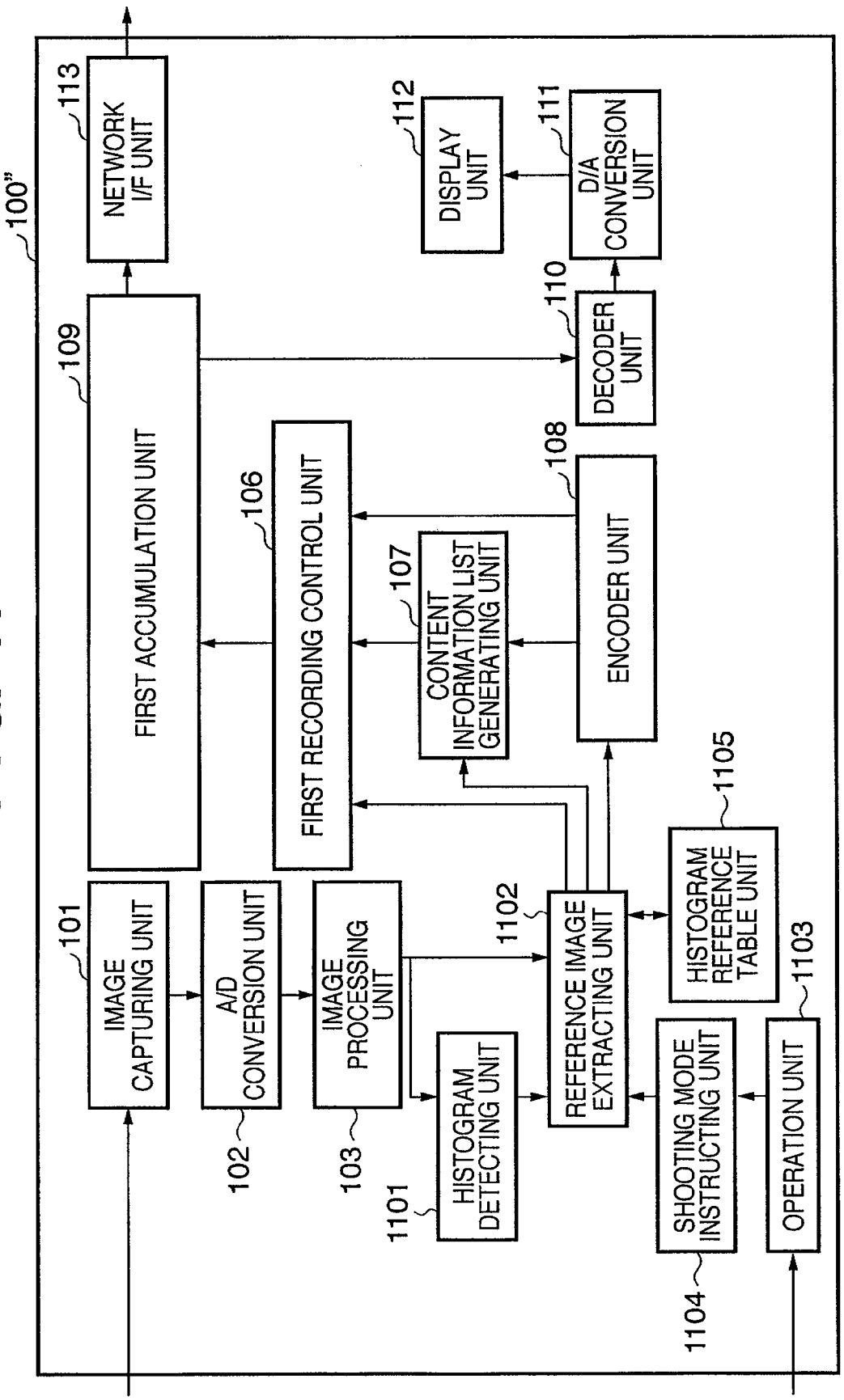
FIG. 11 is a block diagram showing an exemplary configuration of an image capturing apparatus according to a third embodiment of the present invention.

FIG. 11 is a block diagram showing an exemplary configuration of an image capturing apparatus 100" according to a third embodiment of the present invention. In FIG. 11, the same reference numerals are attached to constituent elements that are the same as FIG. 1, and unnecessary description will be omitted.

A histogram detecting unit 1101 computes a histogram for the luminance and color components of pixels constituting an input image frame, as information showing characteristics of the image frame, and transmits the data to a reference image extracting unit 1102.

An operation unit 1103, which is composed of keys, buttons, switches or the like, is an interface for the user to input instructions to the image capturing apparatus 100". In the present embodiment, the operation unit 1103 is provided with a mode setting dial, which functions as a shooting mode setting unit, for setting the shooting modes (scenes) of the image capturing apparatus 100", such as portrait mode, sports mode, and sunset mode, for example.

The shooting mode set using the mode setting dial is detected with a shooting mode instructing unit 1104 and notified to the reference image extracting unit 1102.

A histogram reference table unit 1105 stores a table in which each settable shooting mode in the image capturing apparatus 100″ of the present embodiment is associated with a histogram, which is information showing a representative image characteristic that an image shot in that shooting mode is considered to have.

For example, a histogram characteristic of an image shot of a sunset (e.g., very large red component relative to blue component) is stored as a histogram corresponding to the sunset mode. FIG. 12 shows an exemplary table stored by the histogram reference table unit 1105. Here, data filenames, as information that specifies corresponding histogram data, are listed as reference histograms. Histogram data is also stored in the histogram reference table unit 1105.

The reference image extracting unit 1102 searches the histogram reference table unit 1105 with the shooting mode notified from the shooting mode instructing unit 1104 as a key, and acquires a histogram having the representative characteristic corresponding to the current shooting mode. The reference image extracting unit 1102 then compares the acquired histogram with the histogram of the current image frame received from the histogram detecting unit 1101.

The reference image extracting unit 1102 judges that the current image frame has the representative characteristic of an image frame shot in the current shooting mode if the total difference in the values of corresponding levels in the histograms is at or below a threshold value, and extracts the current image frame as a reference image.

The reference image extracting unit 1102 generates a reference image data file in a similar manner to the reference image extracting unit 105 in the first embodiment, and outputs the generated reference image data file to the first recording control unit 106. The reference image extracting unit 1102 also supplies all input image frames to the encoder unit 108, and notifies the image frame extracted as a reference image. The reference image extracting unit 1102 further notifies information specifying the reference image data file to the content information list generating unit 107.

Since the operations of other constituent elements including the first recording control unit 106, the content information list generating unit 107 and the encoder unit 108 are as described in the first embodiment, further description will be omitted.

Encoded moving image data files, content information lists and reference image data files recorded by the image capturing apparatus 100″ of the present embodiment can be used by the image processing apparatus 400 of the first embodiment.

In the present embodiment, representative histograms having characteristics that correspond to the shooting modes are provided in advance, and an image frame having a histogram similar to a representative histogram is extracted as a representative image from captured image frames.

Therefore, a resolution conversion table can be generated using an image frame typical for the shooting mode, out of the high resolution image frames that have actually been shot. Consequently, a resolution conversion table that corresponds to the shooting mode is generated in the case where playback is performed after resolution conversion, enabling a resolution conversion result that conforms to the tendencies of the captured subject to be obtained.

Here, the image frame extracted as a reference image is viewed as the first image frame of the scene in the first embodiment, and resolution conversion tables that correspond to the individual reference images are generated as described in the first embodiment. However, a single resolution conversion table may be created from a plurality of reference images extracted within the same scene, with the group of moving images recorded from the start of shooting in a certain shooting mode until the shooting mode is switched or the end of shooting is instructed taken as one scene. In this case, the plurality of reference images will be associated with the same playback time in the content information list. The resolution conversion table generating unit 404 of the image processing apparatus 400 generates a single resolution conversion table based on the plurality of (original resolution and downsampled) reference images associated with the same playback time.

Fourth Embodiment

Figure 13:
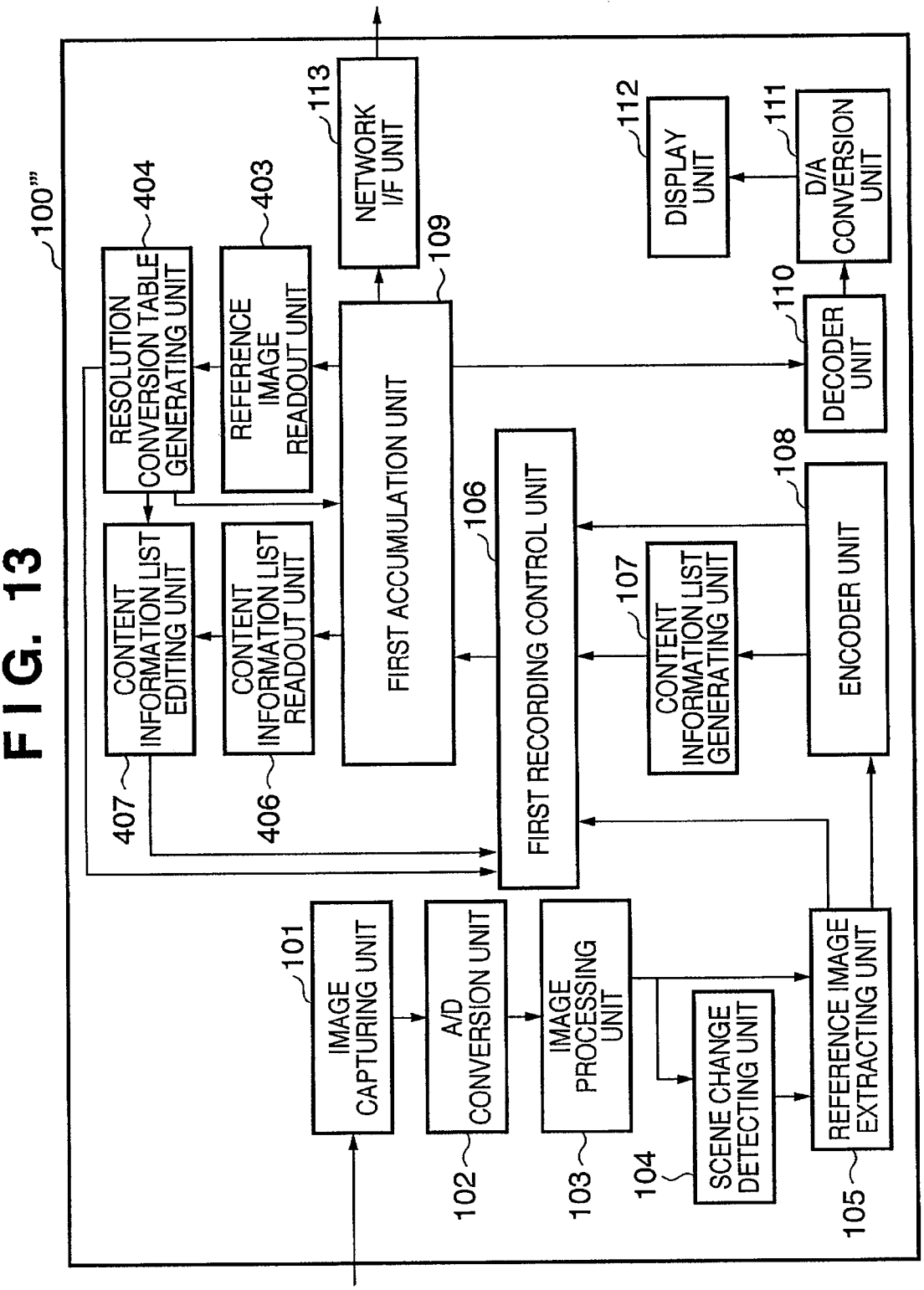
FIG. 13 is a block diagram showing an exemplary configuration of an image capturing apparatus according to a fourth embodiment of the present invention.

FIG. 13 is a block diagram showing an exemplary configuration of an image capturing apparatus 100‴ according to a fourth embodiment of the present invention. In FIG. 13, the same reference numerals are attached to constituent elements that are the same as FIGS. 1 and 4, and unnecessary description will be omitted.

The image capturing apparatus 100‴ of the present embodiment has the function of generating resolution conversion tables that was performed by the image processing apparatus 400 of the first embodiment.

Specifically, the image capturing apparatus 100‴ according to the fourth embodiment can be obtained by combining the reference image readout unit 403, the resolution conversion table generating unit 404, the content information list readout unit 406 and the content information list editing unit 407 included in the image processing apparatus 400 according the first embodiment with the image capturing apparatus 100 according to the first embodiment.

Processing performed by the image capturing apparatus 100‴ of the present embodiment to accumulate reference image data files, and to encode moving image data files and content information lists in the first accumulation unit 109 is similar to the first embodiment. On the other hand, when a reference image data file is newly added to the first accumulation unit 109, the reference image readout unit 403 reads out that reference image data file, and supplies the read reference image data file to the resolution conversion table generating unit 404. The resolution conversion table generating unit 404 generates a resolution conversion table using the high resolution reference image and a reference image of the same resolution as the image frames constituting the encoded moving image data file generated by downsampling, as described using FIG. 5. The generated resolution conversion table is output to the first recording control unit 106. The resolution conversion table generating unit 404 also notifies information specifying the generated resolution conversion table (e.g., table name) and information specifying the reference image used to the content information list editing unit 407.

The first recording control unit 106 stores the resolution conversion table generated by the resolution conversion table generating unit 404 in the first accumulation unit 109.

The content information list readout unit 406 reads out the content information list from the first accumulation unit 109, and supplies the read content information list to the content information list editing unit 407. The content information list editing unit 407 adds the information specifying the resolution conversion table notified from the resolution conversion table generating unit 404, based on the reference image data filenames in the content information list, and outputs the resultant list to the first recording control unit 106.

The first recording control unit 106 stores the content information list edited by the content information list editing unit 407 in the first accumulation unit 109. Once image input has ended and the process of generating resolution conversion tables has been completed, the first recording control unit 106 deletes the reference image data files used in generating the resolution conversion tables from the first accumulation unit 109.

Finally, the encoded moving image data file, the edited content information list and the resolution conversion tables are recorded to the first accumulation unit 109.

Figure 14:
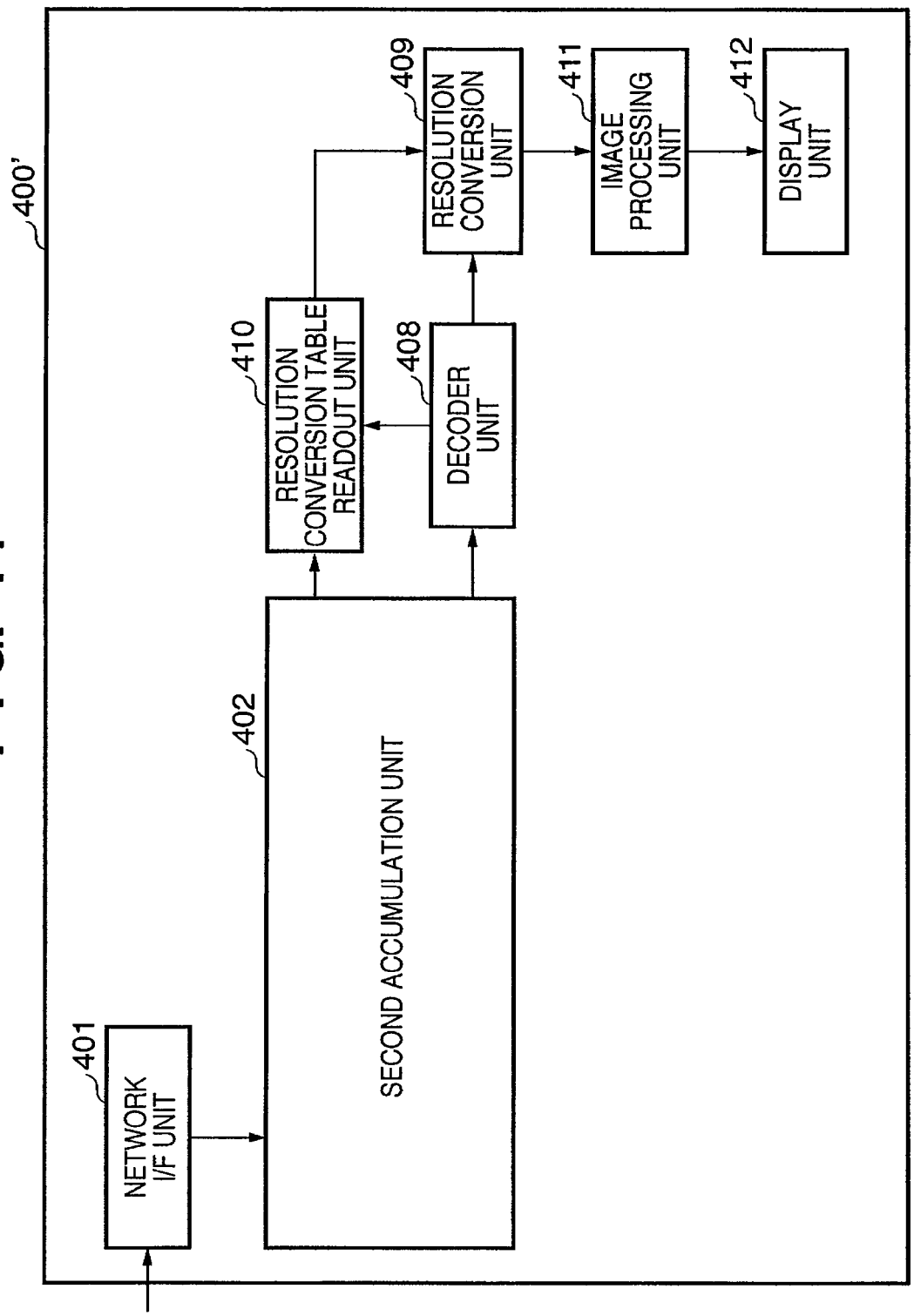
FIG. 14 is a block diagram showing an exemplary configuration of an image processing apparatus according to the fourth embodiment of the present invention.

FIG. 14 is a block diagram showing an exemplary configuration of an image processing apparatus 400' according to the present embodiment.

The image processing apparatus 400' acquires encoded moving image data files, the edited content information list, and resolution conversion tables from the image capturing apparatus 100''' shown in FIG. 13 via the network I/F unit 401, and stores the acquired files, list and tables in the second accumulation unit 402.

When playing an encoded moving image data file, the decoder unit 408 performs decoding while reading out the encoded moving image data file from the second accumulation unit 402, and supplies decoded image frames sequentially to the resolution conversion unit 409. The decoder unit 408 also outputs the PTS of the decoded image frames to the resolution conversion table readout unit 410 as playback time information.

If the playback time shown by the playback time information received from the decoder unit 408 matches a playback time included in the content information list, the resolution conversion table readout unit 410 reads out the resolution conversion table associated with the playback time from the second accumulation unit 402. The resolution conversion table readout unit 410 then supplies the read resolution conversion table to the resolution conversion unit 409.

The resolution conversion unit 409 performs resolution conversion on the image frames input from the decoder unit 408, using the resolution conversion table received from the resolution conversion table readout unit 410, and raises the resolution of the image frames. With resolution conversion, data obtained by analyzing an input image and coding the characteristics between pixels is indexed, and pixel density is increased by applying resolution conversion tables to obtain a higher resolution image than the input image. The image processing unit 411 performs image processing such as color processing and gamma processing, and displays the resolution converted image on the display unit 412.

The image capturing apparatus 100''' and the playback apparatus of the present embodiment thus enable extracted reference image frames to be erased and the required storage capacity for accumulating reference image frames to be reduced, since the resolution conversion table is generated in the image capturing apparatus 100'''. Since reference image data files do not need to be transferred from the image capturing apparatus 100''' to the playback apparatus, the data amount flowing on the network can also be reduced.

Note that even in the present embodiment, a configuration is possible in which a plurality of reference images are extracted from one scene, and a single resolution conversion table is created from the plurality of reference images, as described in the first embodiment.

Other Embodiments

Note that the foregoing embodiments can also be realized with software running on a computer (or CPU, MPU, etc.) of a system or an apparatus.

Consequently, the present invention is also realized by a computer program supplied to a computer, in order to realize the foregoing embodiments by computer. In other words, a computer program for realizing the functions of the foregoing embodiments is also one aspect of the invention.

Note that a computer program for realizing the foregoing embodiments may take any form, provided that it is computer readable. For example, the computer program can be composed of object code, a program executed by an interpreter, or script data supplied to an operating system, while not being limited to these configurations.

A computer program for realizing the foregoing embodiments is supplied to a computer by a storage medium or by wired/wireless communication. Examples of storage media for supplying the program include magnetic storage media such as flexible disk, hard disk and magnetic tape, optical/magneto-optical storage media such as MO, CD and DVD, and nonvolatile semiconductor memory.

One method of supplying a computer program using wired or wireless communication involves utilizing a server on a computer network. In this case, a data file (program file) capable of becoming a computer program that forms the present invention is stored on the server. The program file may be in execution format or source code.

The computer program is then supplied by downloading the program file to a client computer that has accessed the server. In this case, it is also possible to divide the program file into a plurality of segment files, and disperse the segment files among different servers.

That is, a server apparatus that provides a program file for realizing the foregoing embodiments to a client computer is also one aspect of the invention.

It is also possible to distribute a storage medium storing a computer program for realizing the foregoing embodiments in encrypted form, supply decryption key information to a user that meets a prescribed requirement, and permit installation to the user's computer. The key information can be supplied by being downloaded from a website via the Internet, for example.

A computer program for realizing the foregoing embodiments may utilize the functions of an operating system already running on a computer.

Further, part of a computer program for realizing the foregoing embodiments may be composed of firmware such as an expansion board mounted in a computer, or may be executed by a CPU provided with an expansion board or the like.

Although the embodiments of the invention have been described in terms of "extracting" an image frame for use as a reference image, the image frame is not necessarily removed from the sequence of image frames. Such "extraction" can be achieved, for example, by copying the relevant data, thus leaving the reference image frame in the frame sequence.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-102129, filed on Apr. 9, 2007, which is hereby incorporated by reference herein its entirety.

What is claimed is:

1. An image capturing apparatus having an image sensor and a processor, for capturing a moving image using the image sensor, wherein the processor is programmed to control a determining unit to determine an image frame to be used as a reference image frame in resolution conversion of the moving image captured by the image sensor, from a plurality of image frames constituting the moving image;

a file generating unit to generate a reference image data file from the reference image frame determined by the determining unit;

an encoding unit to reduce the resolution of the plurality of image frames and generate an encoded moving image data file from the image frames having a reduced resolution;

an information generating unit to generate information specifying the reference image frame;

a list generating unit to generate a list associating the information generated by the information generating unit specifying the reference image frame with information specifying the reference image data file;

a first recording control unit to store the reference image data file, the encoded moving image data file, and the list in a first storage unit; and an accumulation unit to accumulate information related to the reference image frame, wherein if the newly-determined image frame is found in the plurality of image frames, the determining unit is further controlled to determine whether a similar image frame has already been used as a reference image frame, with reference to the accumulation unit, and if it is determined by the determining unit that a similar image frame has already been used as a reference image frame, the list generating unit is further controlled to associate, in the list, information specifying a reference image data file generated from the similar image frame with information specifying the newly-determined image frame.

2. The image capturing apparatus according to claim 1, wherein the determining unit is further controlled to determine an image frame determined to have a scene change from a previous image frame to be the reference image frame from the plurality of image frames.

3. An image capturing apparatus having an image sensor and a processor, for capturing a moving image using the image sensor, wherein the processor is programmed to control:

a determining unit to determine an image frame to be used as a reference image frame in resolution conversion of the moving image captured by the image sensor, from a plurality of image frames constituting the moving image;

a file generating unit to generate a reference image data file from the reference image frame determined by the determining unit;

an encoding unit to reduce the resolution of the plurality of image frames and generate an encoded moving image data file from the image frames having a reduced resolution;

an information generating unit to generate information specifying the reference image frame;

a list generating unit to generate a list associating the information generated by the information generating unit specifying the reference image frame with information specifying the reference image data file;

a first recording control unit to store the reference image data file, the encoded moving image data file, and the list in a first storage unit;

a shooting mode setting unit to allow a user to set one of a plurality of shooting modes; and a second storage unit to store each of the plurality of shooting modes in association with information showing a representative image characteristic of the shooting mode, wherein the determining unit is further controlled to determine, with reference to the second storage unit, an image frame determined to have the representative image characteristic corresponding to the shooting mode set by the shooting mode setting unit to be the reference image frame from the plurality of image frames.

4. An image capturing apparatus having an image sensor and a processor, for capturing a moving image using the image sensor, wherein the processor is programmed to control:

a determining unit to determine an image frame to be used as a reference image frame in resolution conversion of the moving image captured by the image sensor, from a plurality of image frames constituting the moving image;

a file generating unit to generate a reference image data file from the reference image frame determined by the determining unit;

an encoding unit to reduce the resolution of the plurality of image frames and generate an encoded moving image data file from the image frames having a reduced resolution;

an information generating unit to generate information specifying the reference image frame;

a list generating unit to generate a list associating the information generated by the information generating unit specifying the reference image frame with information specifying the reference image data file;

a first recording control unit to store the reference image data file, the encoded moving image data file, and the list in a first storage unit;

a first readout unit to read out the reference image data file from the first storage unit;

a resolution reduction unit to generate, from the reference image frame included in the read reference image data file, a low resolution reference image frame having a resolution equal to the image frames constituting the encoded moving image data file;

a resolution conversion table generating unit to generate, from the reference image frame and the low resolution reference image frame, a resolution conversion table for raising the resolution of the image frames constituting the encoded moving image data file, and output the generated resolution conversion table to the first recording control unit;

a second readout unit to read out the list from the first storage unit; and a list editing unit to associate the resolution conversion table with the list, and outputs a resultant list to the first recording control unit, wherein the first recording control unit is further controlled to record the list from the list editing unit and the resolution conversion table to the first storage unit.

5. The image capturing apparatus according to claim 4, wherein the first recording control unit is further controlled to delete the reference image data file used in generating the resolution conversion table from the first storage unit.

6. An image processing apparatus having a processor programmed to control an acquisition unit to acquire a reference image data file, an encoded moving image data file and a list from an image capturing apparatus according to claim 1, and store the acquired reference image data file, encoded moving image data file and list in a third storage unit;

a first readout unit to read out the reference image data file from the third storage unit;

a resolution reduction unit to generate, from the reference image frame included in the read reference image data file, a low resolution reference image frame having a resolution equal to the image frames constituting the encoded moving image data file;

a resolution conversion table generating unit to generate, from the reference image frame and the low resolution reference image frame, a resolution conversion table for raising the resolution of the image frames constituting the encoded moving image data file;

a second readout unit to read out the list from the third storage unit;

a list editing unit to associate the resolution conversion table with the list, and outputs a resultant list;

a second recording control unit to record the list output by the list editing unit and the resolution conversion table in the third storage unit;

a decoding unit to decode the encoded moving image data file, and outputs the image frames constituting the encoded moving image data file;

a resolution conversion unit to perform resolution conversion on the image frames output by the decoding unit, with application of the resolution conversion table based on the list; and an output unit to output the resolution converted image frames.

7. An image processing apparatus having a processor programmed to control:

an acquisition unit to acquire an encoded moving image data file, a list and a resolution conversion table from an image capturing apparatus according to claim 1;

a resolution reduction unit to generate, from a reference image frame included in the read reference image data file, a low resolution reference image frame having a resolution equal to the image frames constituting the encoded moving image data file;

a resolution conversion table generating unit to generate, from the reference image frame and the low resolution reference image frame, a resolution conversion table for raising the resolution of the image frames constituting the encoded moving image data file, and to output the generated resolution conversion table; and a list editing unit to associate the resolution conversion table with the list, and outputs a resultant list, the image processing apparatus to store the acquired encoded moving image data file, list and resolution conversion table in a third storage unit, the image processing apparatus further comprising:

a decoding unit to decode the encoded moving image data file, and outputs the image frames constituting the encoded moving image data file;

a resolution conversion unit to perform resolution conversion on the image frames output by the decoding unit, with application of the resolution conversion table based on the list; and an output unit to output the resolution converted image frames.

8. A method of controlling an image capturing apparatus that captures a moving image, comprising the steps of:

determining an image frame to be used as a reference image frame in resolution conversion of the moving image, from a plurality of image frames constituting the moving image;

generating a reference image data file from the reference image frame;

reducing the resolution of the plurality of image frames and generating an encoded moving image data file from the image frames having a reduced resolution;

generating information specifying the reference image frame;

generating a list associating the information generated in the information generating step specifying the reference image frame with information specifying the reference image data file; and storing the reference image data file, the encoded moving image data file and the list in a first storage unit; and accumulating information related to the reference image frame, wherein if the newly-determined image frame is found in the plurality of image frames, the step of determining further determines whether a similar image frame has already been used as a reference image frame, with reference to the information accumulated in said step of accumulating, and if it is determined that a similar image frame has already been used as a reference image frame, said step of generating a list further associates, in the list, information specifying a reference image data file generated from the similar image frame with information specifying the newly-determined image frame.

9. The method according to claim 8, wherein said step of determining includes defining an image frame determined to have a scene change from a previous image frame as the reference image frame from the plurality of image frames.

10. A method of controlling an image capturing apparatus that captures a moving image, comprising the steps of:

determining an image frame to be used as a reference image frame in resolution conversion of the moving image, from a plurality of image frames constituting the moving image;

generating a reference image data file from the reference image frame;

reducing the resolution of the plurality of image frames and generating an encoded moving image data file from the image frames having a reduced resolution;

generating information specifying the reference image frame;

generating a list associating the information generated in the information generating step specifying the reference image frame with information specifying the reference image data file;

storing the reference image data file, the encoded moving image data file and the list in a first storage unit;

allowing a user to set one of a plurality of shooting modes; and storing each of the plurality of shooting modes in association with information showing a representative image characteristic of the shooting mode, in a second storage unit wherein in the determining, an image frame determined to have the representative image characteristic corresponding to the shooting mode set by the user is determined, with reference to the second storage unit, to be the reference image frame from the plurality of image frames.

11. A method of controlling an image capturing apparatus that captures a moving image, comprising the steps of:

determining an image frame to be used as a reference image frame in resolution conversion of the moving image, from a plurality of image frames constituting the moving image;

generating a reference image data file from the reference image frame;
reducing the resolution of the plurality of image frames and generating an encoded moving image data file from the image frames having a reduced resolution;
generating information specifying the reference image frame;
generating a list associating the information generated in the information generating step specifying the reference image frame with information specifying the reference image data file;
storing the reference image data file, the encoded moving image data file and the list in a first storage unit;
reading out the reference image data file from the first storage unit;
generating, from the reference image frame included in the read reference image data file, a low resolution reference image frame having a resolution equal to the image frames constituting the encoded moving image data file;
generating, from the reference image frame and the low resolution reference image frame, a resolution conversion table for raising the resolution of the image frames constituting the encoded moving image data file;
reading out the list from the first storage unit; and
associating the resolution conversion table with the list,
wherein the list to which the resolution conversion table has been associated and the resolution conversion table are stored in the first storage unit.

12. The method according to claim 11, wherein the reference image data file used in generating the resolution conversion table is deleted from the first storage unit after the resolution conversion table is generated.

13. A method of controlling an image processing apparatus being adapted to process images captured by an image capturing apparatus that includes:
a processor programmed to control:
a determining unit to determine an image frame to be used as a reference image frame in resolution conversion of a moving image captured by an image sensor of the image capturing apparatus, from a plurality of image frames constituting the moving image;
a file generating unit to generate a reference image data file from the reference image frame determined by the determining unit;
an encoding unit to reduce the resolution of the plurality of image frames and generate an encoded moving image data file from them;
an information generating unit to generate information specifying the reference image frame;
and a list generating unit to generate a list associating the information generated by the information generating unit specifying the reference image frame with information specifying the reference image data file, the method comprising the steps of:
acquiring the reference image data file, the encoded moving image data file and the list generated by the image capturing apparatus, and storing the acquired reference image data file, encoded moving image data file and list in a storage unit;
generating, from the reference image frame included in the read reference image data file, a low resolution reference image frame having a resolution equal to the image frames constituting the encoded moving image data file;
generating, from the reference image frame and the low resolution reference image frame, a resolution conversion table for raising the resolution of the image frames constituting the encoded moving image data file;
a list editing step of associating the resolution conversion table with the list, and outputting a resultant list;
storing the list output in the list editing step and the resolution conversion table to the storage unit;
decoding the encoded moving image data file, and outputting the image frames constituting the encoded moving image data file;
performing resolution conversion on the image frames output in the decoding step, with application of the resolution conversion table based on the list; and
outputting the resolution converted image frames.

14. A method of controlling an image processing apparatus adapted to process images captured by an image capturing apparatus that includes:
a processor programmed to control:
a resolution reduction unit to generate, from a reference image frame included in a read reference image data file, a low resolution reference image frame having a resolution equal to image frames constituting an encoded moving image data file;
a resolution conversion table generating unit to generate, from the reference image frame and the low resolution reference image frame, a resolution conversion table for raising the resolution of the image frames constituting the encoded moving image data file, and to output the generated resolution conversion table; and
a list editing unit to associate the resolution conversion table with a list, and outputs a resultant list, the method comprising the steps of:
acquiring the encoded moving image data file, the list and the resolution conversion table, generated by the image capturing apparatus and storing the acquired encoded moving image data file, list and resolution conversion table in a storage unit;
decoding the encoded moving image data file, and outputting the image frames constituting the encoded moving image data file;
performing resolution conversion on the image frames output in the decoding step, with application of the resolution conversion table based on the list; and
outputting the resolution converted image frames.

* * * * *